United States Patent
Benabid (10) Patent No.: US 12,291,477 B2
(45) Date of Patent: May 6, 2025

(54) METHOD AND DEVICE FOR MANUFACTURING AN OPTICAL FIBRE

(71) Applicants: UNIVERSITE DE LIMOGES, Limoges (FR); CENTRE NATIONAL DE LA RECHERCHE SCIENTIFIQUE, Paris (FR)

(72) Inventor: Fetah Benabid, Le Palais-sur-Vienne (FR)

(73) Assignees: UNIVERSITE DE LIMOGES, Limoges (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 817 days.

(21) Appl. No.: 17/593,219

(22) PCT Filed: Mar. 5, 2020

(86) PCT No.: PCT/EP2020/055916
§ 371 (c)(1),
(2) Date: Sep. 13, 2021

(87) PCT Pub. No.: WO2020/187595
PCT Pub. Date: Sep. 24, 2020

(65) Prior Publication Data
US 2022/0127183 A1   Apr. 28, 2022

(30) Foreign Application Priority Data
Mar. 15, 2019 (FR) .................................. 1902656

(51) Int. Cl.
C03B 37/029 (2006.01)
C03B 37/027 (2006.01)

(52) U.S. Cl.
CPC .......... *C03B 37/029* (2013.01); *C03B 37/027* (2013.01); *C03B 2205/67* (2013.01)

(58) Field of Classification Search
None
See application file for complete search history.

(56) References Cited

U.S. PATENT DOCUMENTS

| 4,727,237 A | 2/1988 | Schantz |
| 5,627,921 A | 5/1997 | Lidgard et al. |
| (Continued) | | |

FOREIGN PATENT DOCUMENTS

| EP | 0649007 A1 | 4/1995 |
| EP | 1319636 A2 | 6/2003 |
| (Continued) | | |

OTHER PUBLICATIONS

KR-20140121397-A Clarivate Analytics Machine Translation Retrieved Sep. 4, 2024. (Year: 2024).*
Communication received in European Application No. 20709193.5, dated Mar. 6, 2024.
French Search Report received for Application No. 1902656, dated Nov. 18, 2019.
(Continued)

*Primary Examiner* — Lisa L Herring
(74) *Attorney, Agent, or Firm* — Greer, Burns & Crain, Ltd (57) ABSTRACT

A method for manufacturing an optical fibre, in which a preform is inserted into a furnace, the preform is drawn via an outlet of the furnace, and at least one laser beam is applied to a working zone of the drawn preform, each laser beam being power-modulated according to a modulation frequency. A device for manufacturing an optical fibre is also provided.

26 Claims, 3 Drawing Sheets

(56) References Cited

U.S. PATENT DOCUMENTS

| | | | |
|---|---|---|---|
| 5,992,181 A | 11/1999 | Geertman | |
| 6,539,154 B1 * | 3/2003 | Berkey | C03C 25/002 |
| | | | 385/121 |
| 2002/0020488 A1 | 2/2002 | Fox-Lovell | |
| 2003/0031443 A1 * | 2/2003 | Soljacic | C03C 3/07 |
| | | | 65/435 |
| 2003/0113082 A1 | 6/2003 | Neuberger | |
| 2011/0085768 A1 * | 4/2011 | Nakanishi | C03B 37/02727 |
| | | | 264/1.27 |
| 2017/0240456 A1 * | 8/2017 | Akarapu | C03B 37/02727 |
| 2019/0359517 A1 * | 11/2019 | Argaw | C03B 37/032 |
| 2022/0098085 A1 * | 3/2022 | Akarapu | C03B 37/02727 |

FOREIGN PATENT DOCUMENTS

| | | | |
|---|---|---|---|
| GB | 2213142 A | | 9/1989 |
| KR | 20140121397 A | * | 10/2014 |
| WO | 9623739 A1 | | 8/1996 |

OTHER PUBLICATIONS

International Search Report and Written Opinion received for PCT/EP2020/055916, mailed May 15, 2020.

Roberts, P.J., et al., "Ultimate low loss of hollow-core photonic crystal fibres," Optics Express, 13(1), 2005, pp. 236-244.

First Office Action and Search Report received for Chinese Application No. 202080021424.X, dated Oct. 28, 2022.

* cited by examiner

METHOD AND DEVICE FOR MANUFACTURING AN OPTICAL FIBRE

BACKGROUND

The present invention relates to a method for manufacturing an optical fibre. It also relates to a device for manufacturing an optical fibre.

Today, the limit of the transmission performance of optical fibres is set by dispersion losses.

Hollow-core optical fibre has experienced phenomenal growth since its inception almost 20 years ago. This progress is based on the manufacturing techniques and transmission performance thereof, as well as the applications that have emerged following production thereof, encompassing diverse and varied fields such as telecommunications, non-linear optics, lasers, micromachining, the physics of cold atoms or high-resolution spectroscopy and sensors.

In this context, the state of the art of the transmission losses is approximately 0.1 dB/km at 1550 nm for conventional solid fibres and approximately 2 to 10 dB/km for hollow fibres according to the type of fibre and the spectral range.

The aim of the present invention is to propose a method and a device for manufacturing an optical fibre, improving the transmission performance of said fibres and/or having reduced losses with respect to the current state of the art.

SUMMARY

This objective is achieved with a method for manufacturing an optical fibre, in which:
  a preform is inserted into a furnace,
  the preform is drawn via an outlet of the furnace, and
  at least one laser beam is applied to a working zone of the thus-drawn preform, each laser beam being power-modulated according to a modulation frequency.

Preferably, the furnace raises the temperature of the preform and the working zone is preferably situated with respect to the furnace such that the working zone of the preform is in viscoelastic phase.

The modulation frequency is preferably greater than 10 Hz and/or less than 10 kHz.

Each laser beam is preferably modulated between a maximum power and a minimum power. Preferably, the minimum power value is comprised between 95% of the maximum power and 0% of the maximum power.

Each laser beam can be frequency-modulated over an interval ranging from the maximum power to at least 50% of this maximum power.

Each laser beam can be frequency-modulated over an interval ranging from the maximum power to at least 10% of this maximum power.

Each laser beam is preferably power-modulated according to a modulation frequency greater than 100 Hz.

Each laser beam is preferably power-modulated according to a modulation frequency less than 1000 kHz.

The at least one laser beam preferably comprises several laser beams crossing one another on the working zone.

Each laser beam preferably has a wavelength greater than 200 nm and/or less than 12 µm.

Each laser beam preferably has a power greater than 10 W.

Each laser beam is preferably collimated onto a working zone.

The preform is preferably a glass preform.

The working zone of the drawn preform preferably comprises a structure composed of walls the thickness of which is less than 10 µm, preferably less than 3 µm, preferably less than 1 µm.

The part of the wavefront of each laser beam coming into contact with the working zone preferably has, at each given instant, a spatial power density comprised between a maximum and 80% of this maximum.

The working zone is preferably situated outside the furnace.

The furnace preferably comprises:
  an enclosure through which the preform passes, and
  a heat source arranged in the enclosure and raising the temperature inside the enclosure, the working zone being situated at a distance less than 10 cm from the heat source.

The working zone is preferably at a temperature above a softening or vitreous transition temperature of the material constituting the preform, preferably above 700° C., preferably above 1000° C., preferably above 1500° C.

According to yet another aspect of the invention, a device for manufacturing an optical fibre is proposed, comprising:
  a furnace
  an inlet for inserting a preform into the furnace,
  means for drawing the preform via an outlet of the furnace, and
  emission means arranged to apply to a working zone of the thus-drawn preform, at least one laser beam, and modulation means arranged to power-modulate each laser beam according to a modulation frequency.

The modulation frequency is preferably greater than 10 Hz and/or less than 10 kHz.

The modulation means are preferably arranged so that each laser beam is modulated between a maximum power and a minimum power. The minimum power value is preferably comprised between 95% of the maximum power and 0% of the maximum power.

The modulation means are preferably arranged so that each laser beam is frequency-modulated over an interval ranging from the maximum power to at least 50% of this maximum power.

The modulation means are preferably arranged so that each laser beam is frequency-modulated over an interval ranging from the maximum power to at least 10% of this maximum power.

The modulation means are preferably arranged so that each laser beam is power-modulated according to a modulation frequency greater than 10 Hz.

The modulation means are preferably arranged so that each laser beam is power-modulated according to a modulation frequency less than 1000 kHz.

The emission means are preferably arranged so that the at least one laser beam comprises several laser beams crossing one another on the working zone.

The emission means are preferably arranged so that each laser beam has a wavelength greater than 200 nm and/or less than 12 µm.

The emission means are preferably arranged so that each laser beam has a power greater than 10 W.

The emission means are preferably arranged so that each laser beam is collimated onto the working zone.

The emission means are preferably arranged so that the part of the wavefront of each laser beam coming into contact with the working zone has, at each given instant, a spatial power density comprised between a maximum and 80% of this maximum.

The working zone is preferably situated outside the furnace.

The furnace preferably comprises:
an enclosure through which the preform passes, and
a heat source located in the enclosure and arranged to raise the temperature inside the enclosure, the working zone being situated at a distance less than 10 cm from the heat source.

The emission means and the furnace are preferably arranged so that the working zone is at a temperature above a softening or vitreous transition temperature of the material constituting the preform, preferably above 1000° C., preferably above 1500° C.

According to yet another aspect of the invention, a fibre is proposed obtained by a method according to the invention or by a device according to the invention (based on the preform).

BRIEF DESCRIPTION OF THE DRAWINGS

Other advantages and features of the invention will become apparent on reading the detailed description of implementations and embodiments that are in no way limitative, and from the following attached drawings:

FIG. 4 is an enlargement of the part 10 in FIG. 3 and is a diagrammatic cross section profile view of a wall 7 of the preform 1 at the level of the working zone 4 with (FIG. 4a) and without (FIG. 4b) implementation of a method according to the invention.

DETAILED DESCRIPTION

As these embodiments are in no way limitative, variants of the invention can in particular be considered comprising only a selection of the characteristics described or illustrated hereinafter, in isolation from the other characteristics described or illustrated (even if this selection is isolated within a phrase comprising these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

Firstly, with reference to FIGS. 1 to 5, a first embodiment will be described of the device 101 for manufacturing an optical fibre according to the invention.

Figure 1:
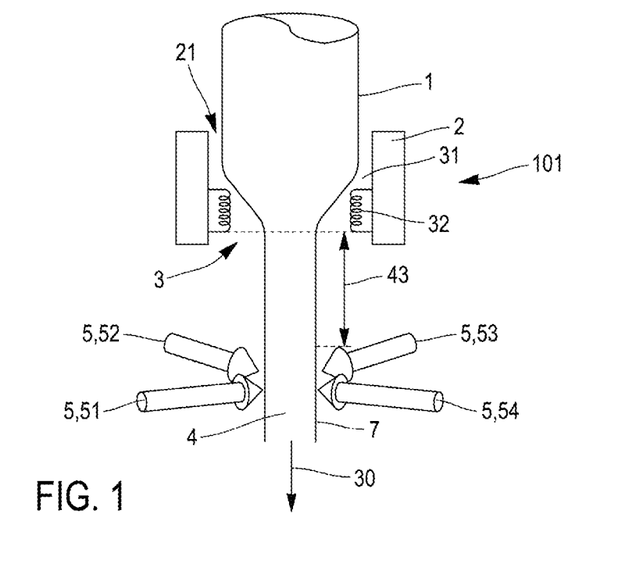
FIG. 1 is a diagrammatic cross section profile view of a first embodiment of device 101 according to the invention, through which a preform 1 is passing.
Figure 2:
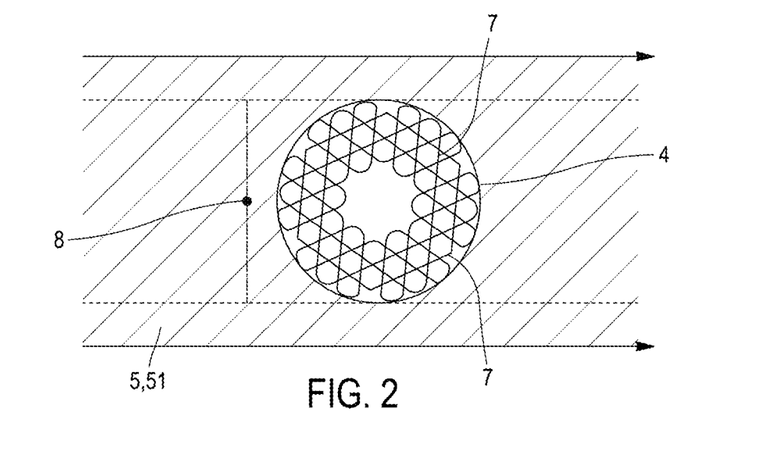
FIG. 2 is a diagrammatic cross section top view of the preform 1 at the level of a working zone 4.
Figure 3:
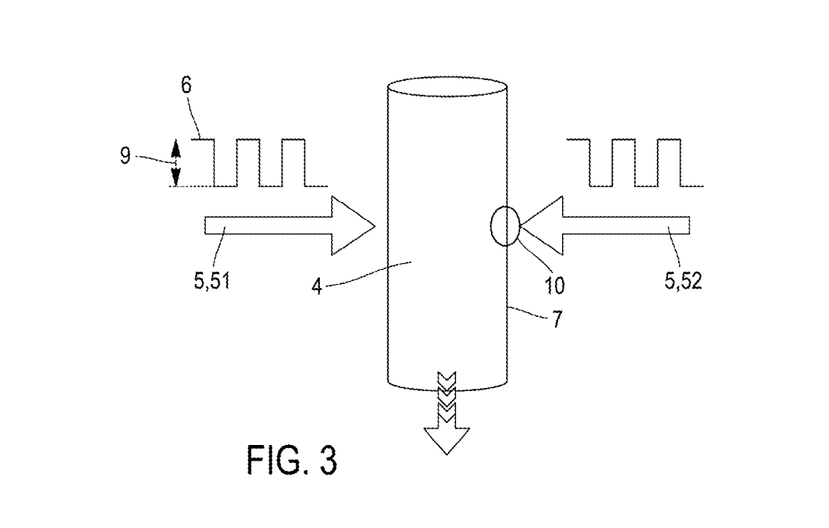
FIG. 3 is a diagrammatic profile view of the preform 1 at the level of the working zone 4.

The device 101 comprises a furnace 2. The furnace 2 is for example a fibre-drawing industrial furnace from Nextrom.

The furnace 2 comprises an inlet 21 arranged for inserting a preform 1 (typically a glass rod) into the furnace 2. The device 101 also comprises, on the side of the inlet 21, holding means (not shown) arranged to hold a first end of the preform 1 on the side of the inlet 21. These holding means consist for example of a chuck placed on a translation stage.

The device 101 comprises means for drawing the preform 1 via an outlet 3 of the furnace 2, in a direction of drawing 30. These means (not shown) typically comprise two belts facing one another arranged on the side of the outlet 3 of the furnace 2, where the drawn fibre is placed between the two belts for drawing with an adjustable speed.

The inlet 21 and the outlet 3 are situated at two opposite ends of the furnace 2 in the direction 30.

The device 101 comprises emission means arranged to apply at least one laser beam 5, after the outlet 3 of the furnace 2, to a working zone 4 of the thus-drawn preform 1. These emission means typically comprise one or more laser sources, and optionally complementary optical means for shaping and/or splitting and/or grouping one or more of the at least one laser beam 5.

The emission means are arranged so that the at least one laser beam 5 comprises several laser beams 5 crossing one another on the working zone 4.

The emission means are arranged so that each laser beam has a wavelength greater than 200 nm and/or less than 12 μm.

The emission means are arranged so that each laser beam has a maximum power 6 greater than 10 W.

The emission means are arranged so that each laser beam is collimated onto the working zone 4.

The emission means are arranged so that all the part 8 of the wavefront of each laser beam 5 coming into contact with the drawn fibre 1 (more precisely with the working zone 4) has, at each given instant, a spatial power density comprised between a maximum at this instant t and 80% of this maximum.

Thus, at each instant t, each laser beam 5 has a spatial power density that is substantially homogeneous spatially on the drawn fibre 1 (more precisely on the working zone 4).

In the example shown in FIG. 1, four continuous laser sources from IPG referenced YRL are used, arranged to emit four laser beams 51, 52, 53, 54.

The device 101 also comprises modulation means arranged to power-modulate each laser beam 5 according to a modulation frequency. These modulation means are either already supplied in the laser or by an intensity modulator via an electro-optic and/or acousto-optic route and/or by a rotating toothed wheel.

The modulation frequency is:
greater than 10 Hz, preferably greater than 100 Hz and
less than 10 Hz, preferably less than 1000 Hz.

Thus, each laser beam 5:
is spatially homogeneous or substantially homogeneous in power density at each instant t in question on the drawn fibre 1 (more precisely on the working zone 4) i.e. has, on the drawn fibre 1 (more precisely on the working zone 4) at each instant t in question, a spatial power density comprised between a maximum (specific at this instant t) and 80% of this maximum,
but is temporarily power-modulated according to a modulation frequency.

The modulation means are arranged so that each laser beam 5 is modulated between the maximum power 6 and a minimum power so that the minimum power value is comprised between 95% of the maximum power and 0% of the maximum power, preferably between 95% of the maximum power and 10% of the maximum power. More precisely, the modulation means are arranged so that each laser beam is frequency-modulated over an interval 9 ranging from the maximum power 6 to 50% or less of this maximum power. More precisely, the modulation means are arranged so that each laser beam is frequency-modulated over an interval 9 ranging from the maximum power 6 to 10% or less of this maximum power.

The working zone 4 is situated outside the furnace 2.

The working zone 4 is situated on the side of the outlet 3 of the furnace 2.

The furnace 2 comprises:
an enclosure 31 through which the preform passes, and
a heat source 32 located in the enclosure 31 and arranged to raise the temperature inside the enclosure 31.

The working zone 4 is situated at a distance 43, measured in the direction 30, typically less than 10 cm from the heat source 32.

The distance between the working zone 4 by laser (ZL) and the heating zone 32 of the heat furnace (ZF) is arranged so that the temperature of the drawn preform shows a temperature greater than that of the softening temperature of the preform 1, i.e. such that the preform 1 is viscoelastic at the level of the working zone 4. For a heat furnace operating at temperatures between 1800 and 2000° C., and for drawing speeds of 10 to 100 m/min, this distance can typically be comprised between 5 cm and 10 cm.

Each laser beam 5 is placed such that the drawn preform is in a viscoelastic phase at the level of the working zone 4. In other words, the distance between the laser and the furnace (here furnace is defined as the heating zone) must be sufficiently close so that, at the level of the zone 4, the preform (i.e. the glass) has not yet cooled to the point of solidifying, and sufficiently far from the furnace to ensure optimal operation (i.e. temperature distribution and amplitude comparable to the standard furnace).

The furnace raises the temperature of the preform and the working zone 4 is situated with respect to the furnace such that the working zone of the preform is in viscoelastic phase.

Each laser 5 does not create defects of materials on the preform.

The emission means and the furnace 2 are arranged, in particular by the relative positions of the furnace 2 and the at least one beam(s) 5, so that the working zone 4 is at a temperature above a softening or vitreous transition temperature of the material constituting the preform 1, preferably above 1000° C., preferably above 1500° C.

The vitreous transition temperature is for example:
150° C. for chalcogenide GeSbTe,
245° C. for chalcogenide AsGeSeTe,
235° C. for fluorine glass ZBLAN,
280° C. for tellurium dioxide,
400° C. for fluoroaluminate,
1200° C. for melted quartz.

Thus, the invention is a method and an opto-thermal industrial furnace device making it possible to reduce the effect of dispersion due to inhomogeneity of the density of the glass by photo-absorption effect.

The preform 1 is tempered in the thermal furnace 2, typically a resistance or induction furnace. A section of the preform 1 firstly passes through the heating zone 31 of the furnace 2 and then, by flow effect, into the optical section where the heated section 4 of the preform 1 is excited by the at least one laser beam 5.

A first embodiment of the method according to the invention implemented by the device 101 will now be described with reference to FIGS. 1 to 5.

In this embodiment of the method for manufacturing an optical fibre:
the preform 1 is inserted into the furnace 2,
the preform 1 is drawn via the outlet 3 of the furnace 2, and
the at least one laser beam 5 is applied, after the outlet 3 of the furnace 2, to a working zone 4 of the thus-drawn preform 1, each laser beam 5 being power-modulated according to the modulation frequency.

The modulation frequency is:
greater than 10 Hz, preferably greater than 100 Hz and less than 1000 kHz, preferably less than 10 kHz.

Each laser beam 5 is modulated between the maximum power 6 and a minimum power such that the minimum power value is comprised between 95% of the maximum power and 0% (or preferably 10%) of the maximum power. Preferably, each laser beam is frequency-modulated over an interval 9 ranging from the maximum power 6 to 50% or less of this maximum power. Preferably, each laser beam 5 is frequency-modulated over an interval 9 ranging from the maximum power 6 to 10% or less of this maximum power.

The at least one laser beam 5 comprises several laser beams 5 crossing one another on the working zone 4.

Each laser beam 5 has a wavelength greater than 200 nm and/or less than 12 µm.

Each laser beam 5 has a maximum power 6 greater than 10 W.

Each laser beam 5 is collimated onto the working zone 4.

Preferably, the at least one beam 5 comprises N beams 5 distributed around the zone 4 in a plane perpendicular to the direction 30 with regular separation angles of 2π/N (N being a nonnegative integer).

According to the variant in question, the at least one beam 5 can therefore comprise:
a single beam 5, 51 (FIG. 2)
two beams 51, 52 (FIG. 3) preferably facing one another
three beams 51, 52, 53 (FIG. 5) preferably distributed around the zone 4 with regular angles of 2π/3
four beams (FIG. 1) preferably distributed around the zone 4 with regular angles of π/2,
or even more beams 5, the greater the number of beams 5, the better the homogeneity of illumination of the zone 4.

The preform 1 is a preform made from glass, for example of the silica type.

The working zone 4 of the drawn preform 1 is a microstructured optical fibre.

The working zone 4 of the drawn preform 1 comprises a structure (for example of the Kagome type) composed only of walls 7 (of glass, shown in black on a white background in FIGS. 2 and 5) the thickness of which is less than 10 µm, preferably less than 3 µm, preferably less than 1 µm.

All the part 8 of the wavefront of each laser beam 5 coming into contact with the drawn fibre 1 (more precisely with the working zone 4) has, at each given instant, a spatial power density comprised between a maximum at this instant t and 80% of this maximum. Thus, at each instant t, each laser beam 5 has a spatial power density that is substantially homogeneous spatially on the drawn fibre 1 (more precisely on the working zone 4).

The working zone 4 is situated outside the furnace 2, on the side of the outlet 3.

The working zone 4 is situated at a distance 43, less than 10 cm from the heat source 32.

The working zone 4 is at a temperature above a softening or vitreous transition temperature of the material constituting the preform 1, preferably above 1000° C., preferably above 1500° C.

The invention makes it possible to limit the local density fluctuation for the conventional solid optical fibres and the surface roughness for the hollow-core microstructured fibres, due to a hydrodynamic phenomenon during drawing of the fibre, which induce losses by light dispersion and thus a limit on the transmission performance of the optical fibres.

Figures 4, 4A, 4B:
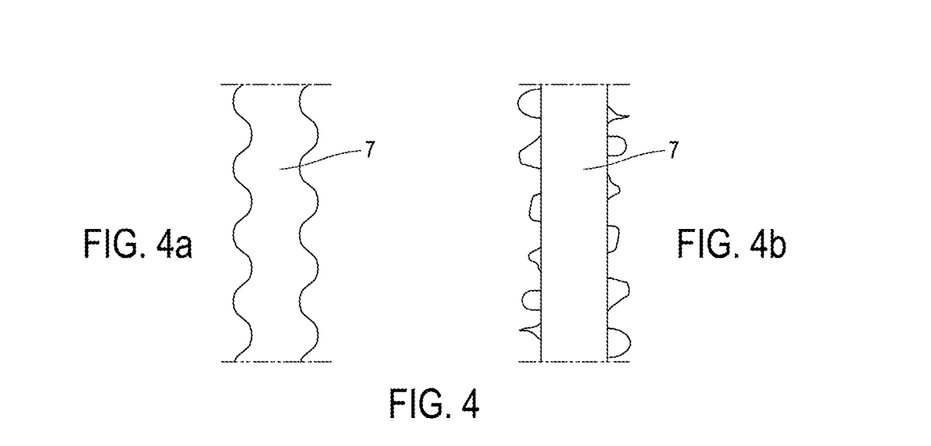
Figure 5:
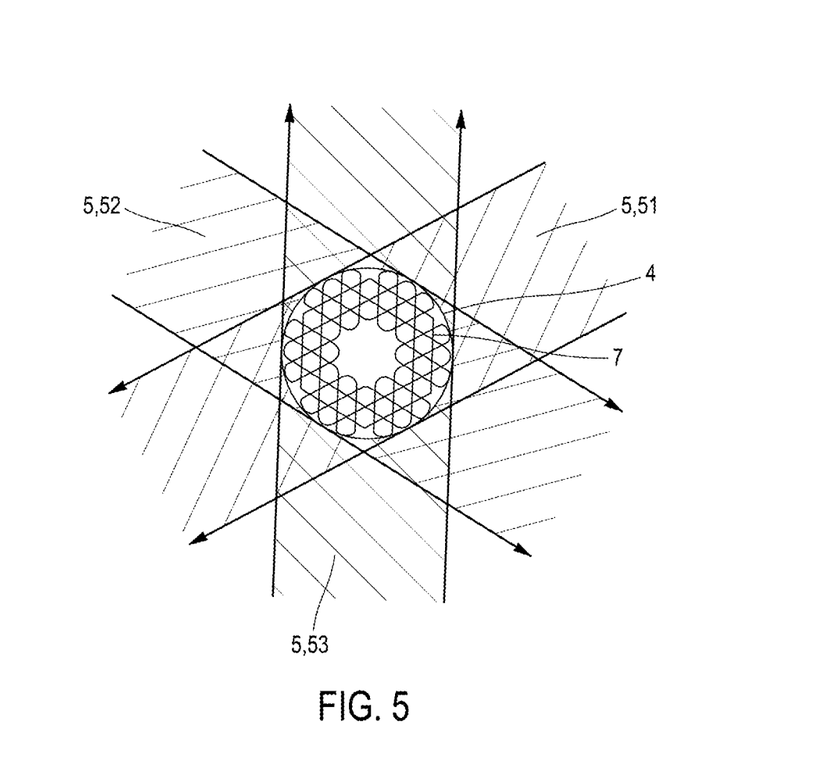
FIG. 5 is a diagrammatic profile view of the preform 1 at the level of the working zone 4 in a variant of the method according to the invention.

During the manufacture of the optical fibre, the preform 1 is inserted into the furnace 2 and heated to a temperature such that the glass undergoes a phase transition and becomes viscoelastic. This "liquid" glass is then drawn into optical fibre. During this liquid phase, the glass is the site of a mass or density fluctuation that can be presented as a stochastic composition of phonon waves. During this drawing the glass undergoes a second phase transition, passing from the liquid to the solid phase, and the aforementioned fluctuations are "frozen". In the case of the conventional solid fibre, these frozen fluctuations adopt the form of nanometric inhomogeneities in the matrix of the glass. These latter induce a dispersion of the guided light and set a transmission loss boundary that is approximately 0.1 dB/km at 1550 nm and changes with the wavelength. In the case of the hollow fibres (hollow-core guiding optical fibre), the frozen fluctuations result from surface waves, called capillary waves, and adopt the form of a surface roughness shown in FIG. 4.b, absent implementation of the method according to the invention, i.e. without the beams 5. This roughness thus induces a light dispersion the amplitude of which is proportional to the coverage rate of the light in the core, with the glass contour and the amplitude of surface roughness. Today, this dispersion is a limit of the state of the art of the hollow fibres.

On the other hand, after implementation of this method according to the invention, as shown in FIG. 4.a there is a reduction in the surface roughness by modulation of the index and mass relative to a surface reference, the beams 5 exciting the surface or the matrix to be treated and thus modulating the index and/or the density by photo-absorption effect.

FIGS. 4.a and 4.b are merely diagrammatic. In reality, the roughnesses (i.e. the "bumps") are lower and "smoother" or less chaotic in FIG. 4.a with respect to FIG. 4.b.

Research has shown that for the hollow fibres guiding by inhibited coupling, of the Kagome or tubular type, the losses can be as low as $10^{-2}$ to $10^{-3}$ dB/km in the spectral range from visible to UV if the surface roughness is significantly reduced.

Similarly, for the conventional fibres (e.g. telecom fibres), reducing the density fluctuation can reduce the lowest current losses of 0.1 dB/km by a factor of 10.

The invention thus addresses a fundamental problem for hollow-core optical fibre or conventional solid-core optical fibres.

In a particular example:
the preform is made from hollow core silica with a microstructure cladding of the Kagome type and has an outside diameter of 40 mm at the inlet 21
the enclosure of the furnace 2 is heated to 1900° C.
the working zone is at a temperature above 1200° C.
the preform 1 is drawn, from the side of the outlet 3, at a speed of 15 m/min
each laser beam 5 has a wavelength of 1060 nm, with a modulation frequency of 220 Hz between a maximum power of 80 W and a minimum power of 30 W.

The optical fibre obtained has an excellent transmission loss.

The invention makes it possible to obtain a hollow fibre with lower losses than in the current state of the art, which will achieve increasingly widespread application in sectors such as:
1. Laser micromachining: The fibre obtained according to the present invention allows flexible and safe routing of a high-flux laser beam.
2. Laser pulse compression: The fibre obtained according to the present invention makes it possible to compress laser pulses by simple optimization of the fibre length and the choice of the gas to be introduced into the core of the fibre.
3. Surgery: The fibre obtained according to the present invention allows flexible and safe routing of a laser beam for endoscope or Lasik-type operations.
4. Cell treatment: The fibre obtained according to the present invention allows flexible and safe routing of an ultra-short laser beam for the targeted destruction of cancer cells without depositing heat.
5. Gas laser: The fibre obtained according to the present invention, and the core of which is filled with an active gas, allows it to be used as a laser cladding medium.
6. Frequency standard: The fibre obtained according to the present invention, and the core of which is filled with a gas (e.g. acetylene, Rb or Cs vapour) allows it to be used as a frequency standard.
7. THz imaging: The THz guide obtained according to the present invention allows flexible and safe routing of THz radiation, and of THz radiation collection for imaging.
8. Waveguide for THz and microwave: The guide obtained according to the present invention allows single-mode THz and/or microwave guiding with low transmission losses.
9. Low latency telecommunication in data centres.

It is noted that in all of the embodiments that have just been described, each beam 5 is not a pulsed laser beam but a power-modulated continuous laser beam.

The power of each laser beam 5, P, is given as a function of time t by:

$$P=P_0+P_m \sin(2\pi v_{mod}t)$$

Here, $v_{mod}$ is the modulation frequency of the power of the laser.

$P_0$ represents the direct or DC part.

$P_m$ is the modulated part of the power.

The expression P as a function of the total (or maximum) power is also written in the form $$P = P_T\left[1 - \frac{P_m}{P_T}(1 - \sin(2\pi v_{mod}t))\right]$$

The ratio $$\frac{P_m}{P_T}$$

represents the depth of modulation.

The transmission in the optical fibre 1 is limited by the light dispersion induced by fluctuations in the density of the glass that are due to "freezing" of thermal waves when the fibre 1 leaves the industrial furnace 31, where the material constituting the fibre 1 passes from a viscoelastic phase (similar to a highly viscous liquid phase) in the industrial furnace 31 to a solid phase outside. Here, the thermal waves are surface waves, and are called capillary waves (CW).

Preferably, the abbreviation CW will be used hereinafter for "capillary wave".

These frozen CWs are a source behind the formation of a surface roughness on the walls of a photonic crystal fibre (PCF) 1 with a hollow core (HCPCF). This surface roughness in HCPCFs is a limiting factor in the transmission of these fibres through the phenomenon of transmission losses by surface dispersion.

Thus, in the present embodiments of the invention, the capillary waves are controlled by restructuring their amplitude, frequency and damping, by generating other capillary waves via a photoelastic phenomenon.

A laser is used to excite the photoelastic phenomenon while the fibre is in "liquid" phase, and in order to create destructive interferences with the capillary waves of thermodynamic origin and/or to remodel the surface according to a desired profile.

Figure 6:
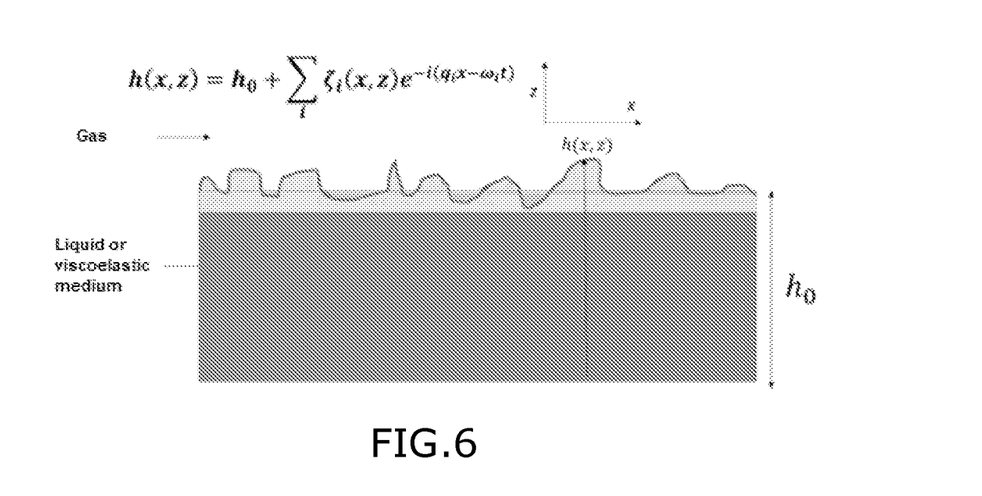
FIG. 6 is a schematic diagram of a capillary wave at the interface between a liquid or viscoelastic medium and a gaseous medium.

FIG. 6 diagrammatically shows a surface roughness. The latter is presented by the height elevation (as a function of the spatial coordinates x and z defining a plane) of a liquid or viscoelastic medium, $h(x,z)=h_0+\Sigma_i\zeta_i(x,z)e^{-i(qz-\omega_i t)}$, induced by capillary waves. Here, $h_0$ is the static height of the medium, and the second term of the right-hand limb of the equation represents a linear combination of several capillary waves. Each CW is determined by its amplitude $\zeta_i(x,z)$, its oscillation frequency $\omega i$, and its wave vector $q_i$ in the direction z.

Frequency

For a very thin membrane h, the pulse $\omega(q)$ (oscillation frequency to the nearest factor 2n) and the wave vector q are linked by the following dispersion equation:

$$\omega(q) = \sqrt{\frac{\gamma h}{\rho}}\, q^2,$$

with $\gamma$ and $\rho$ being the surface tension and the density of the membrane, respectively. Here we have disregarded the contribution of the gas (e.g. air), the density of air and the surface tension being relatively low with respect to those of the membrane.

This expression is valid in the case of a fine membrane, where the effect of gravity can be disregarded in favour of surface tension. Thus, the wave vector amplitude belongs to an interval given by the following inequalities:

$$q_v = \sqrt{\frac{\rho g}{\gamma}} \ll q \ll q_h = h^{-1},$$

Here, $\gamma$ is the surface tension, and g is the gravity acceleration. In the case of glass, this is $q_v \sim 271$ m$^{-1}$ (i.e. wavelength $\lambda_v \sim 2.3$ cm) and $q_h \sim 10^6$ m$^{-1}$ (i.e. wavelength $\lambda_h \sim 1$ µm that is given by the thickness of the membrane) for a glass membrane of 1 µm thickness. This gives the following interval for the oscillation frequencies of a CW in a glass membrane:

$(2\pi) \times 8 Hz \ll \omega \ll (2\pi) \times 2$ MHz,

This calculation can of course be applied to other materials.

Amplitude

As regards the amplitude of each mode of the CW, it is given by the following approximate expression, for thermodynamic excitation (i.e. induced by the thermodynamic temperature fluctuation):

$$\langle \zeta_i(q_i,\omega_i)\rangle = \sqrt{\frac{k_B T}{\gamma q_i^2 + \rho g}} \approx \sqrt{\frac{k_B T}{\gamma q_i^2}},$$

In the case of silica, the working temperature T is comprised between 1734° C. and 2354° C. $k_B$ is the Boltzmann constant.

Consequently, the amplitude of a CW is situated within the following intervals:

0.7 pm $\ll \langle \zeta_v(q_v,\omega_v)\rangle \ll$ 0.8 m,

For the lower limit of the wave vectors, and 0.0002 pm $\ll \langle \zeta_h(q_h,\omega_h)\rangle \ll$ 0.0003 pm, for the upper limit of the wave vectors.

The results show that the modes with low frequencies have the highest amplitudes. Thus, in order to have an order of magnitude of the surface elevations on a given point, induced by these CWs, it is necessary to integrate $\zeta_i(q_i,\omega_i)$ on a part of the interval $[q_v, q_h]$. This gives an average elevation of $$\Delta h_{CW} = \sqrt{\frac{k_B T}{4\pi\gamma}\ln\!\left(\frac{q_h}{q_v}+1\right)} \approx 200\ pm$$

for T=1734° C., and $\Delta h_{CW} \approx 250$ pm for T=2354° C. These values are typical of the measurements obtained on the surfaces of the HCPCFs.

This calculation can of course be applied to other materials.

Damping

Another important property of the CWs is their decay rate. In fact, according to the conditions of excitation or to the boundary conditions, the CWs are propagative or purely evanescent (no oscillations). In both cases, a CW is damped with the following relaxation time:

$$\tau_q = \frac{\rho}{2\eta}\frac{1}{q^2}$$

Here $\eta$ is the viscosity of the medium (membrane). This depends on the temperature in the case of a molten glass. For example for silica glass, $\eta=103$ Pa·s for T=2354° C. and $\eta=10^{6.2}$ Pa·s for T=1734° C. Similarly, as below, the following intervals are found for $\tau_q$:

0.02 µs $\ll \tau_v \ll$ 30 µs, for the low-frequency modes, and 1 fs $\ll \tau_h \ll$ 2 ps, for the high-frequency modes.

This calculation can of course be applied to other materials.

In the light of these intervals for the amplitudes and the relaxation times of the CWs, the low-frequency modes dominate in the formation of roughness. As a result, it is possible to construct the table according to the typical values for the wavelengths, frequency, amplitude and relaxation time, setting the working interval of the wave vectors q to $[q_v, 100\, q_v]$:

Typical properties of a CW in a silica membrane of 1 μm thickness and for temperatures between 1734° C. and 2453° C.

| Wavelength | Oscillation frequency | amplitude | Damping time |
|---|---|---|---|
| 0.2-23 mm | 10 Hz-8 kHz | .01 pm-0.1 pm | 3 ns-30 μs |

The above values (which can of course be re-calculated for other materials) were obtained for silica, adopting the thermomechanical values from the table below:

Thermomechanical properties of silica at 1734° C.-2453° C.

| | |
|---|---|
| Density ($\rho$ (kg · m$^{-3}$)) | 2201 |
| Coefficient of thermal expansion ($\alpha_{th}$ (K$^{-1}$)) | 4.8 × 10$^{-7}$ |
| Thermal conductivity ($\kappa$ (Wm$^{-1}$K$^{-1}$)) | 2.7 |
| Calorific capacity ($C_p$ (J/Kg · K)) | 1052 |
| Viscosity($\eta$ (Pa · s)) | 10$^{6.2}$@1734° C., 10$^3$@2453° C. |
| Surface tension ($\gamma$ (J · m$^{-2}$)) | 0.3 @1231° C. |

The dynamic of the CWs is generated by thermal noise. The CWs can be controlled if a carefully chosen external excitation (of each beam 5) is applied. This can be shown through the development of a CW over time in the presence of an excitation F(t) described in the following equation:

$$\frac{\partial \zeta_i(x,z)}{\partial t} + \frac{\zeta_i(x,z)}{\tau_{qi}} = T(x,z) + F(t)$$

Here, T(x,z) represents the force induced by the aforementioned thermodynamic noise. Under conditions such that $T(x,z) \ll F(t)$, this equation is reduced to that of the oscillation of a forced damped harmonic. With an excitation of $F(t) \propto F\cos(\omega t+\varphi)$, with the right choice of, F, pulse $\omega$ and phase $\varphi$, it is possible to control the oscillatory movement to increase/decrease its deceleration speed, significantly reduce its amplitude or restructure the surface profile.

$\tau_{qi}$ is relaxation time of the capillary wave i for the material in question, for example silica.

Similarly, the boundary conditions of the CWs can be controlled or modified with the profile and the spatial extent of the external excitation, and as a result give the roughness a particular profile.

In particular, with careful dimensioning of the spatial extent of the excitation, its amplitude F and its modulation frequency, it is possible to structure the surface such that one CW dominates the remainder of the capillary waves and the final position of the excitation corresponds to the trough of the amplitude of the dominant CW. The result is a flatter surface than that of a surface generated by the thermodynamic noise.

These are the two control levers, namely the spatial extent of excitation and its amplitude and modulation frequency, which the invention can exploit.

According to the invention, in order to generate the external excitation for controlling the CWs within or on the surface of a viscoelastic medium, it is possible to rely on the combination of two physical phenomena. The first is the photothermal effect, and the second the thermoelastic effect. It is noted that these phenomena are different from those associated with inscribing a Bragg grating in the fibres (e.g. photo-sensitivity), which implies an electron restructuring. The contrast with the photothermal and photoelastic phenomena is the fact that these latter do not involve a change of index or electron change of the medium. For example, the medium 1 must show a level of viscoelasticity capable of carrying out the desired control of the CWs; this is a major difference vis-h-vis the Bragg grating inscription techniques.

The photothermal effect involves a thermodynamic temperature fluctuation induced by photo-absorption. This fluctuation is induced by the intrinsic fluctuation of the light (i.e. "shot-noise"). In parallel, the thermoelastic effect involves a geometric deformation (e.g. change of length) induced by a temperature change, via the phenomenon of thermoelasticity, itself induced by optical absorption photothermal expansion. In other words, $\Delta h/h = \alpha_{th}\Delta T$, with $\alpha_{th}$ being the dilatation coefficient, $\Delta T$ the temperature change and $\Delta h/h$ the relative change of the length of the medium. In practical terms, the temperature variation is a temperature modulation, which can be produced by photoabsorption of the power-modulated laser 5. This can be formulated as a modulation of the change of length: $\Delta h/h \propto \alpha_{th} P_{abs} \cos(2\pi v_{mod} t)$, where $P_{abs}$ is the power of the laser absorbed by the medium.

The amplitude of the surface deformation induced by the photothermal effect in the case of a collimated (unfocused) laser, power-modulated at the frequency $v_{mod}$ and in normal incidence on the surface, can be quantified by its response function (in units of length), given below:

$$h_{PT}(v) = \frac{\sqrt{2}}{\pi} \frac{\alpha_{th}}{\kappa}(1+\sigma)\begin{cases} \langle P_{abs}\rangle \frac{vc}{v} & si\ v \gg vc \\ \langle P_{abs}\rangle & si\ v \ll vc \end{cases}$$

Here the quantities $\alpha_{th}$, $\kappa$ and $\sigma$ are respectively the dilation coefficient, the thermal conductivity and the Poisson ratio of the medium (e.g. glass) respectively. $vc = (2\pi)^{-1}\sqrt{\kappa/\rho C w_0^2}$, with $\rho$ and C being respectively the density and the calorific capacity of the heated medium and $w_0$ the effective radius of the laser 5. For silica, this cut-off frequency is written as $$vc = 2\ \text{Hz} \frac{100\ \mu m}{w_0},$$

i.e. a cut-off frequency of 2 Hz for a laser of effective diameter of 200 μm. $\langle P_{abs}\rangle$ is the average power of the laser absorbed by the drawn preform. This is determined by both the absorption coefficient of the medium at the wavelength of the laser, and the aforementioned parameters of $$P_0, \frac{P_m}{P_T}.$$

Here, the characteristic times of the photoabsorption are much more rapid for the reason that the modulation frequency is not affected by the value of $\langle P_{abs}\rangle$. This gives $$\langle P_{abs}\rangle = \alpha_{abs}\sqrt{P_0^2 + \frac{P_m^2}{2}}$$

It is noted that in the event of maximum modulation depth (i.e. $P_O=0$, and $P_m=P_T$), then $\langle P_{abs}\rangle = \alpha_{abs}P_m/\sqrt{2}$. While for a small modulation $$\frac{P_m}{P_T} \sim 0,$$

then $\langle P_{abs}\rangle = \alpha_{abs}P_0$. As a result, in the event of non-modulation, there is a constant and "static" deformation of $$h_0 \approx \sqrt{S_{PT}(v \to 0)} \approx \frac{1}{\pi}\left(\frac{\alpha_{th}}{\kappa}\right)(1+\sigma)\alpha_{abs}P_0$$

So that this deformation does not dominate that induced by the CWs, let $$h_0 \geq \Delta h_{CW}$$

This inequality sets constraints on the power of the laser given by $$P_0 \geq \frac{\pi\kappa}{\alpha_{th}(1+\sigma)\alpha_{abs}}\Delta h_{CW}.$$

Returning to the case of a silica glass membrane given above it is found that $$P_0 \geq 45W,$$

For an absorption coefficient of 100 ppm.

When the laser is power-modulated at frequencies greater than vc, the deformation is written $$\Delta h \approx h_0 \frac{vc}{v}\sqrt{1+\left(\frac{P_m}{P_T}\right)^2\left(1-\frac{P_m}{P_T}\right)^{-2}}$$

This expression shows the role of the frequency, v, and of the modulation depth $$\frac{P_m}{P_T},$$

in controlling the surface. Finally, it will be seen that the impact of the value of the modulation frequency is determined by vc.

The frequency vc is linked to the thermal relaxation time of an excitation induced by the photoelastic phenomenon, or even to the length of thermal diffusion.

$$\tau_c = 2\lambda v_c^{-1}$$

Which gives a relaxation time for silica of $$\tau_c \approx 3s\frac{w_0}{100\ \mu m}.$$

This formula shows the role of the size of the laser beam in the relaxation of the thermal waves generated by photoelasticity. It should be noted that the dispersion length is independent of $w_0$, as shown by the formula below:

$$L_{th} = \sqrt{\frac{\kappa}{\rho C v}} = w_0\sqrt{\frac{v_c}{v}}$$

The dispersion length $L_{th}$ can only be controlled by the modulation frequency. Silica glass gives $L_{th} \sim 30$ μm for a modulation frequency of 1 KHz, and $L_{th} \sim 300$ μm for a modulation frequency of 10 Hz. As a result, the modulation frequency can be used as means for controlling $L_{th}$ (i.e. the spatial extent of the CW generated) without affecting the damping of the capillary wave.

The following table gives the impact of the parameters of the laser on the surface structure.

| Impact of the laser parameters on control of the surface profile | |
|---|---|
| Continuous power ($P_0$) | 1. Primary profile of the surface (long range) |
| Modulation frequency (v) | 1. Selective excitation of the short range CWs |
| | 2. Control of the dispersion length |
| Modulation depth | 1. Control of the amplitude of short range CWs |
| Beam size | 1. Control of the relaxation time of the CWs |
| | 2. Control of the boundary conditions of the CWs (i.e. control of the phases of the CWs) |
| Distance laser-industrial furnace | 1. Adjustment with respect to the viscoelastic state of the CWs induced by the thermodynamic noise in the thermal industrial furnace. |
| | 2. Control of the boundary conditions of the CWs (i.e. control of the phases of the CWs) |

A point is reached where the operating conditions can be deployed in order to fashion the surface of a glass subjected to CWs induced by thermal noise (can be generalised to a volume). Dimensioning the invention in order to structure the surface can be carried out by establishing a hierarchy between the characteristic times (i.e. in an equivalent manner: the characteristic lengths) associated with the different effects underlying the generation of the CWs by thermal noise in the industrial furnace and their control by photonic excitation.

The table below summarizes the characteristic times in

| Impact of the laser parameters on control of the surface profile | | | |
|---|---|---|---|
| Characteristic time | Associated phenomenon | Expression | Interval |
| Cooling time ($\tau_{cool}$) | Cooling time of a heated glass on output from the industrial furnace | $\frac{\rho C_p}{\kappa}\frac{V}{A}2w_0$ | 1 ms-60 ms |
| Laser-material interaction time ($\tau_{int}$) | The interaction time with the laser of a glass (e.g. fibre) in uniform movement at a speed $v_d$ | $\frac{2w_0}{v_d}$ | 100 μs-10 ms |

-continued

Impact of the laser parameters on control of the surface profile

| Characteristic time | Associated phenomenon | Expression | Interval |
|---|---|---|---|
| Laser-material modulation time ($\tau_{las}$) | Time associated with the power modulation of the laser | $\dfrac{1}{v_{mod}}$ | 1 ms-10 s |
| Thermal relaxation time ($\tau_{therm}$) | Cooling time of a glass heated by photoabsorption | $\dfrac{\rho C_p}{\kappa} w_0^2$ | 8 ms-3 s |
| Correlation time of a CW ($\tau_{CW}$) | Time associated with the correlation length of a CW | $\dfrac{\sqrt{\gamma/g\rho}}{c_s}$ | 0.7 µs-1 µs |

V and A volume and longitudinal area of glass heated by the thermal industrial furnace.
$c_s$ speed of sound of the heated glass.
$v_d$ drawing speed of the glass on output from the thermal industrial furnace.
See text for the other parameters.

Below are the different operating conditions:

Operating conditions for surface shaping

| Description of the condition | Condition on the parameters of the device |
|---|---|
| The amplitude of the dominant CW induced by photoelasticity must be greater than the amplitude of the dominant CW by thermal noise. This condition is imposed in order to be able to shape the surface by photoelasticity. | $P_0 \geq 45$ W |
| The distance industrial furnace-laser beam, d, must be sufficiently short so that the temperature of the fibre at the output of the furnace, $T_h$, remains greater than the softening temperature. A condition for having the CWs min induced in the furnace remain dynamic and not solidified (or "frozen"). | $d \leq v_d \tau_{cool} \ln\left(\dfrac{T_h}{T_{soft}}\right)$<br>For silica<br>$d \leq 10$ mm for $v_d = 10$ m/min |
| The time of passage of the fibre/preform in the laser beam must be sufficiently long so that the photoelasticity phenomenon is established over the entire volume of the glass "tempered" in the laser beam. | $\tau_{int} \geq \max(\tau_{las}, \tau_{therl})$ |
| One of the strategies for damping the amplitude of the CWs induced by thermal noise in the industrial furnace, is to "neutralize" them by interference with the CWs generated by photoelasticity. This implies that the frequency interval of the CWs induced by photoelasticity is the same as that of the CWs induced by thermal noise. As a result, this determines an interval for the modulation frequency of the laser. | $v_{mod} \in 2\pi^{-1}\left[g\sqrt{\dfrac{\rho h}{\gamma}}, \sqrt{\dfrac{\gamma}{\rho h^3}}\right]$<br>For silica<br>$v_{mod} \in [10\text{ Hz}, 8\text{ KHz}]$ |
| Another strategy to flatten the roughness is to exploit the undulatory properties of the CW and their boundary conditions in order to set their amplitude to zero by superposing the position of the valley of a CW on the margin of the zone of the laser beam.<br>This condition can be produced by controlling the diameter of the laser (see opposite) and/or the position thereof. | $q_{cw} \times 2w_0 = (2n+1)\pi$<br>For the dominant CW<br>$2w_0 \sqrt{\dfrac{\rho g}{\gamma}} = (2n+1)\pi$<br>(here n is an integer)<br>For silica<br>$2w_0 = (2n+1) \times 11$ mm |

All these calculations throughout the description can of course be re-calculated for other materials.

Of course, the invention is not limited to the examples that have just been described, and numerous modifications may be made to these examples without exceeding the scope of the invention.

In a variant, the preform 1 is not hollow or microstructured but can be a solid glass fibre.

Of course, the various characteristics, forms, variants and embodiments of the invention can be combined together in various combinations inasmuch as they are not incompatible or mutually exclusive.

The invention claimed is:

1. A method for manufacturing an optical fibre, in which:
a preform is inserted into a furnace;
the preform is drawn via an outlet of the furnace;
at least one laser beam is applied to a working zone of the thus-drawn preform, each laser beam being power-modulated according to a modulation frequency;
the modulation frequency being greater than 10 Hz and less than 1000 kHz;
each laser beam having a power greater than 10 W;
the working zone being at a temperature above a softening or vitreous transition temperature of the material constituting the preform;
a part of the wavefront of each laser beam coming into contact with the working zone having, at each given instant, a spatial power density comprised between a maximum and 80% of this maximum; and
the working zone of the drawn preform comprises a structure composed of walls the thickness of which is less than 10 µm.

2. The method according to claim 1, characterized in that the modulation frequency is greater than 10 Hz and less than 10 kHz.

3. The method according to claim 1, characterized in that each laser beam is modulated between a maximum power and a minimum power such that a minimum power value is comprised between 95% of the maximum power and 0% of the maximum power.

4. The method according to claim 3, characterized in that each laser beam is frequency-modulated over an interval ranging from the maximum power to at least 50% of this maximum power.

5. The method according to claim 4, characterized in that each laser beam is frequency-modulated over an interval ranging from the maximum power to at least 10% of this maximum power.

6. The method according to claim 1, characterized in that each laser beam is power-modulated according to a modulation frequency greater than 100 Hz and less than 1000 kHz.

7. The method according to claim 1, characterized in that the at least one laser beam comprises several laser beams crossing one another on the working zone.

8. The method according to claim 1, characterized in that each laser beam has a wavelength greater than 200 nm and less than 12 µm.

9. The method according to claim 1, characterized in that each laser beam is collimated onto the working zone.

10. The method according to claim 1, characterized in that the preform is a glass preform.

11. The method according to claim 1, characterized in that the working zone is situated outside the furnace.

12. The method according to claim 1, characterized in that the furnace comprises:
- an enclosure through which the preform passes, and
- a heat source arranged in the enclosure and raising the temperature inside the enclosure, the working zone being situated at a distance less than 10 cm from the heat source.

13. The method according to claim 1, characterized in that the working zone is at a temperature above 1000° C.

14. The method according to claim 1, characterized in that each laser beam is power-modulated according to a modulation frequency greater than 100 Hz and less than 1000 kHz.

15. A method for manufacturing an optical fibre, in which:
- a preform is inserted into a furnace;
- the preform is drawn via an outlet of the furnace;
- at least one laser beam is applied to a working zone of the thus-drawn preform, each laser beam being power-modulated according to a modulation frequency;

the modulation frequency being greater than 10 Hz and less than 1000 kHz;

each laser beam having a power greater than 10 W;

the working zone being at a temperature above a softening or vitreous transition temperature of the material constituting the preform;

a part of the wavefront of each laser beam coming into contact with the working zone having, at each given instant, a spatial power density comprised between a maximum and 80% of this maximum; and wherein the furnace comprises:
- an enclosure through which the preform passes, and
- a heat source arranged in the enclosure and raising the temperature inside the enclosure, the working zone being situated at a distance less than 10 cm from the heat source.

16. The method according to claim 15, characterized in that the modulation frequency is greater than 10 Hz and less than 10 kHz.

17. The method according to claim 15, characterized in that each laser beam is modulated between a maximum power and a minimum power such that a minimum power value is comprised between 95% of the maximum power and 0% of the maximum power.

18. The method according to claim 17, characterized in that each laser beam is frequency-modulated over an interval ranging from the maximum power to at least 50% of this maximum power.

19. The method according to claim 18, characterized in that each laser beam is frequency-modulated over an interval ranging from the maximum power to at least 10% of this maximum power.

20. The method according to claim 15, characterized in that the at least one laser beam comprises several laser beams crossing one another on the working zone.

21. The method according to claim 1, characterized in that each laser beam has a wavelength greater than 200 nm and less than 12 μm.

22. The method according to claim 15, characterized in that each laser beam is collimated onto the working zone.

23. The method according to claim 15, characterized in that the preform is a glass preform.

24. The method according to claim 15, characterized in that the working zone is situated outside the furnace.

25. The method according to claim 15, characterized in that the working zone is at a temperature above 1000° C.

26. A device for manufacturing an optical fibre, comprising:
- a furnace;
- an inlet for inserting a preform into the furnace;
- means for drawing the preform via an outlet of the furnace; and
- emission means arranged to apply to a working zone of the thus-drawn preform, at least one laser beam, and modulation means arranged to power-modulate each laser beam according to a modulation frequency;

the modulation frequency being greater than 10 Hz and less than 1000 kHz;

the emission means being arranged so that each laser beam has a power greater than 10 W;

the emission means and the furnace being arranged so that the working zone is at a temperature above a softening or vitreous transition temperature of a material constituting the preform;

the emission means being arranged so that a part of the wavefront of each laser beam coming into contact with the working zone has, at each given instant, a spatial power density comprised between a maximum and 80% of this maximum; and wherein the furnace comprises:
- an enclosure through which the preform passes, and
- a heat source arranged in the enclosure and raising the temperature inside the enclosure, the working zone being situated at a distance less than 10 cm from the heat source.

* * * * *